(12) United States Patent
Keller et al.

(10) Patent No.: US 10,257,801 B2
(45) Date of Patent: Apr. 9, 2019

(54) ENABLING DUAL REGISTRATION OF USER EQUIPMENT WITH IP MULTIMEDIA SUBSYSTEMS

(71) Applicant: Telefonaktiebolaget LM Ericsson (publ), Stockholm (SE)

(72) Inventors: Ralf Keller, Würselen (DE); Mats Ola Stille, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/536,064

(22) PCT Filed: Mar. 24, 2015

(86) PCT No.: PCT/EP2015/056286
§ 371 (c)(1),
(2) Date: Jun. 14, 2017

(87) PCT Pub. No.: WO2016/150491
PCT Pub. Date: Sep. 29, 2016

(65) Prior Publication Data
US 2017/0339655 A1    Nov. 23, 2017

(51) Int. Cl.
*H04W 4/00*    (2018.01)
*H04W 60/00*    (2009.01)
(Continued)

(52) U.S. Cl.
CPC ......... *H04W 60/005* (2013.01); *H04L 65/105* (2013.01); *H04L 65/1016* (2013.01);
(Continued)

(58) Field of Classification Search
CPC ....... H04W 60/00; H04W 60/04; H04W 8/26; H04W 8/04; H04W 12/06; H04W 88/02; H04W 88/06; H04W 48/15
(Continued)

(56) References Cited

U.S. PATENT DOCUMENTS

| | | | |
|---|---|---|---|
| 8,457,046 B2 | 6/2013 | Bogner et al. | |
| 2014/0369267 A1* | 12/2014 | Ni | H04W 76/10 370/329 |
| 2015/0208446 A1* | 7/2015 | Yeoum | H04L 65/1046 370/329 |

FOREIGN PATENT DOCUMENTS

DE    102006026929 A1    12/2007

OTHER PUBLICATIONS

Alexander, Steve et al., "DHCP Options and BOOTP Vendor Extensions," Network Working Group, Request for Comments: 2132, Category: Standards Track, Mar. 1997, Internet Engineering Task Force (IETF), 31 pages.
(Continued)

*Primary Examiner* — Temica M Beamer
(74) *Attorney, Agent, or Firm* — Withrow & Terranova, PLLC (57) ABSTRACT

A method of enabling dual registration of a User Equipment, UE, with first and second Internet Protocol Multimedia Subsystem, IMS, networks, the method comprising, in response to a connection request made to a gateway node by the UE, sending to the UE, network addresses of respective first and second Proxy Call Session Control Functions, P-CSCF, the first and second P-CSCFs being configured to enable IMS registrations to the first and second IMS networks respectively.

15 Claims, 7 Drawing Sheets

(51) Int. Cl.
　　　 H04L 29/06　　(2006.01)
　　　 H04W 8/08　　 (2009.01)
　　　 H04W 8/12　　 (2009.01)
　　　 H04W 88/06　　(2009.01)
　　　 H04W 84/04　　(2009.01)
(52) U.S. Cl.
　　　 CPC .......... H04L 65/1073 (2013.01); H04W 8/08 (2013.01); H04W 8/12 (2013.01); H04W 84/042 (2013.01); H04W 88/06 (2013.01)
(58) Field of Classification Search
　　　 USPC ............................. 455/435.1, 552.1, 553.1
　　　 See application file for complete search history.

(56) References Cited

OTHER PUBLICATIONS

Author Unknown, "IMS Profile for Voice and SMS," GSM Association, Official Document IR.92, Version 7.0, Mar. 3, 2013, GSM Association, pp. 1-32.

Author Unknown, "LTE Roaming Guidelines," GSM Association, Official Document IR.88, Version 9.0, Jan. 24, 2013, GSM Association, pp. 1-53.

Author Unknown, "Rich Communication Suite 5.2 Advanced Communications Services and Client Specification," GSM Association, Official Document RCC.07, Version 5.0, May 7, 2014, GSM Association, pp. 1-550.

Author Unknown, "Technical Specification Group Services and System Aspects; IP Multimedia Subsystem (IMS); Stage 2 (Release 13)," Technical Specification 23.228, Version 13.2.0, 3GPP Organizational Partners, Mar. 2015, 311 pages.

Author Unknown, "Technical Specification Group Core Network and Terminals; Non-Access-Stratum (NAS) protocol for Evolved Packet System (EPS); Stage 3 (Release 8)," Technical Specification 24.301, Version 8.1.0, 3GPP Organizational Partners, Mar. 2009, 250 pages.

International Search Report and Written Opinion for International Patent Application No. PCT/EP2015/056286, dated Dec. 10, 2015, 10 pages.

Examination Report for European Patent Application No. 15711771.4, dated Jul. 23, 2018, 10 pages.

* cited by examiner

ENABLING DUAL REGISTRATION OF USER EQUIPMENT WITH IP MULTIMEDIA SUBSYSTEMS

This application is a 35U.S.C. § 371 national phase filing of International Application No. PCT/EP2015/056286, filed Mar. 24, 2015, the disclosure of which is incorporated herein by reference in its entirety.

TECHNICAL FIELD

The field of the invention is enabling dual registration of user equipment with IP Multimedia Subsystems.

BACKGROUND

Rich Communication Services is a Groupe Speciale Mobile Association (GSMA) programme for providing enhanced communications features such as enhanced messaging, enriched calls with multimedia content and enhanced 'phonebook. It is typically used in conjunction with Voice over Long Term Evolution (VoLTE). GSMA allows a mobile operator to deploy two IMS networks, one for RCS and one for VoLTE. Such a deployment has the advantage that it allows a clear separation of responsibilities within the operator. A device such as a mobile phone which is capable of using both RCS and VoLTE services can use two different IMS core systems for the two different services.

In order to be able to register with two IMS networks, User equipment (UE) must know or be able to obtain the IP address of the respective Proxy Call Session Control Functions (P-CSCF) which provide an entry to the respective IMS networks. These IP addresses are typically local IP addresses, which are valid within the network in which the P-CSCF nodes are located, but not useable from outside of the network. The IP addresses are made available to the UE either by preconfiguring the UE or by P-CSCF discovery.

P-CSCF discovery is normally used to find a single IP address for the P-CSCF before a UE performs a conventional single registration, either within a home or a visited network. To enable UE's to perform dual registration in a home network, it is typical to provide a preconfigured IP address used to identify a P-CSCF providing for access to a second IMS, such as an RCS IMS. This preconfigured IP address may be provided in the form of an Open Mobile Alliance (OMA) Device Management (DM) protocol Management Object (MO). The advantage of such a method of provision of this second IP address is that it can be used for access via other non-3GPP networks such as Wi-Fi.

Although the method of pre-configuration is completely satisfactory for use when the UE is in its home network, this IP address, being a local address, cannot be used when the UE is roaming. A second Packet Data Network (PDN) connection is therefore required, linking the roaming UE to a P-CSCF for the second IMS in its own home network. This is a cumbersome solution as separate PDN connections are needed.

SUMMARY

Accordingly, the present invention seeks to provide a method of dual registration with two separate IMS networks for a single PDN connection which may be used in a visited network as well as a home network. In a first aspect of the present invention there is provided a method of enabling dual registration of a User Equipment, UE, with first and second Internet Protocol Multimedia Subsystem, IMS, networks. The method comprises, in response to a connection request made to a gateway node by the UE, sending to the UE, network addresses of respective first and second Proxy Call Session Control Functions, P-CSCF, the first and second P-CSCFs being configured to enable IMS registrations to the first and second IMS networks respectively.

Preferably the method further comprises registration by the UE with the first IMS via the first P-CSCF using the first network address and registration by the UE with the second IMS via the second P-CSCF using the second network address.

Optionally the UE is located in a Visited Public Mobile Network, VPMN, and the first and the second IMS networks are associated with a home network of the UE.

Optionally at least one of the first and the second IMS networks is one of: a Voice over Long Term Evolution, VoLTE, IMS and a Rich Communications Services, RCS, IMS.

Optionally the connection request comprises a Long Term Evolution, LTE, Attach request.

Optionally the connection request comprises a network address request located in a Protocol Configuration Options, PCO, Information Element, IE.

Optionally the connection request comprises a Rich Communications Services, RCS, P-CSCF address request.

Optionally at least one of the first network address and the second network address is provided by means of the PCO IE in an ACTIVATE DEFAULT EPS BEARER CONTEXT REQUEST message to the UE.

Optionally at least one indication associated with at least one of the first and the second network addresses indicating the type of service to which the network address enables connection is provided to the UE.

In a second aspect of the present invention, there is provided an apparatus for use in user equipment in a communication network. The apparatus comprises processor circuitry, a storage unit storing instructions executable by the processor circuitry, a transmitter and a receiver, wherein the apparatus is operative to send a connection request to a gateway node, to receive, in response to the connection request, a response comprising a first network address associated with a first P-CSCF, send a register request for a first IMS to the first P-CSCF using the first network address, determine whether the response contains a second network address associated with a second P-CSCF and if the response contains a second network address send a register request for a second IMS to the second proxy server using the second network address.

Optionally, the apparatus is further configured, in the event of receipt of a response from the network gateway without a second network address, to send a register request for a second IMS to a P-CSCF located in a home network of the UE using a pre-configured network address. In a third aspect of the present invention, there is provided a User Equipment comprising an apparatus according to the second aspect of the invention.

In a fourth aspect of the present invention, there is provided an apparatus for use in a network gateway in a Public Land Mobile Network, PLMN, wherein the apparatus comprises processor circuitry, a storage unit storing instructions executable by the processor circuitry a transmitter and a receiver whereby the apparatus is operative to receive from a User Equipment, UE, a connection request and in response to the request send a first and a second network address associated respectively with a first and a second P-CSCF, wherein the first and second network addresses enable the UE to register respectively with a first and a second IMS.

Optionally the apparatus is further configured to provide the first and second network addresses in response to the request received from a UE for which the PLMN is a visited network.

In a fifth aspect of the present invention, there is provided a network node comprising apparatus according to the fourth aspect of the invention.

In a sixth aspect of the present invention there is provided computer program, comprising instructions which, when executed on at least one processor, cause the at least one processor to carry out a method according to the first aspect of the invention.

In a seventh aspect of the present invention there is provided a computer program product comprising a computer program according to the sixth aspect of the invention.

In an eighth aspect of the present invention there is provided a carrier containing a computer program according to the seventh aspect of the present invention, wherein the carrier optionally includes an electrical signal, an optical signal, a radio signal, a magnetic tape or disk, an optical disk or a memory stick.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

Figure 1:
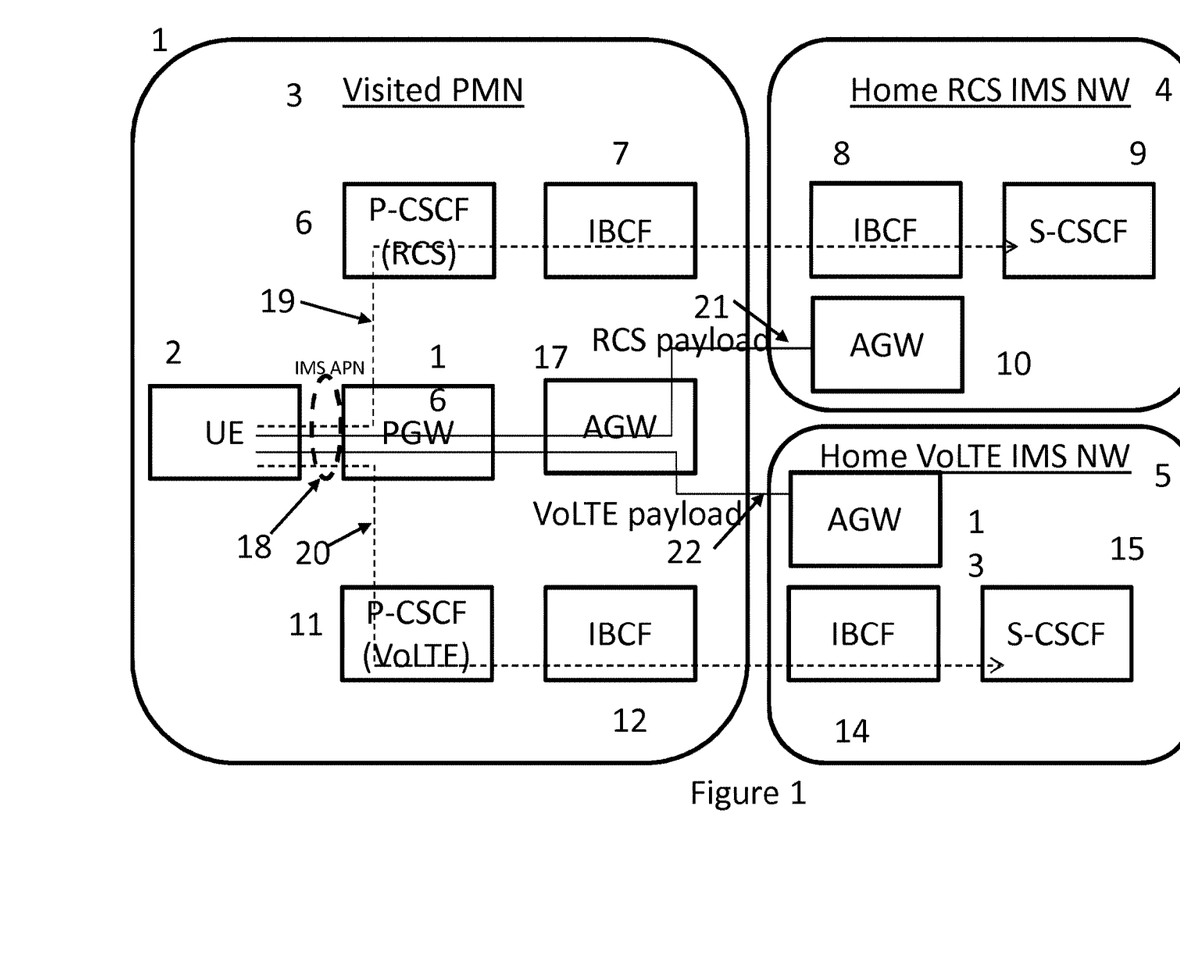
FIG. 1 is a schematic view of a communications network on which the present invention may be implemented.

FIG. 1 is a schematic view of a typical communications network (1) on which the present invention may be implemented. FIG. 1 shows three networks, a Visited Public Mobile Network (VPMN) (3) and two home networks (4, 5). The User Equipment (2) is located within the VPNM (3). The first home network (4) comprises a Rich Communications System (RCS) Internet Protocol Multimedia Subsystem (IMS) and the second home network (5) comprises a Voice over Long Term Evolution (VoLTE) IMS. In this embodiment, the IMS networks are shown to be in separate home networks. However, the person skilled in the art would recognize that both of the IMS networks could be located within the same home network and the invention is not limited to the arrangement with separate home networks. Likewise the method may be used entirely within the home network for a non-roaming UE, in which case the provision of the second IP address replaces the conventional preconfigured IP address for the second registration.

The VPMN (3) comprises a Packet Data Network Gateway (PGW) (16) and an access gateway (AGW) (17), which handle data traffic and control messages. There are in addition two Proxy Call Session Control Function (P-CSCF) nodes (6, 11), which provide a SIP proxy for the two IMS networks (4, 5) and associated Interconnection Border Control Functions (IBCF) (7,12). Control and user plane traffic (18) is transmitted between the UE (2) and the PGW (16). The PGW sends RCS control plane data (19) to P-CSCF (RCS) (6), whereupon it is forwarded to the Serving Call Session Control Function (S-CSCF) (9) of the RCS IMS (4) via the IBCF (7) for the VPMN (3) and an IBCF (8) for the home RCS network (4). The VoLTE control plane traffic (20) is similarly routed through the VoLTE P-CSCF (11), the IBCF (12) of the visited network and an IBCF (14) of the VoLTE home network to an S-CSCF (15) of the VoLTE home network (5). The RCS payload is routed through the Access Gateway (AGW) (17) of the visited network, to an AGW (10) of the RCS home network (4). The VoLTE payload is similarly routed via the AGW (17) and an AGW (13) in the VoLTE home network (5). The person skilled in the art will appreciate that the network arrangement of FIG. 1 is exemplary only and that the invention is applicable to other network node arrangements. In the embodiments described, the connection request is sent from the UE to a PGW, with the latter providing network addresses for the P-CSCF's which respectively implement the two registrations. However, the invention is not limited to the provision of network addresses by a PGW and this task may be performed by any network node in the appropriate network. Likewise, it is envisaged that the network addresses are most likely to be IP addresses. However, the person skilled in the art will appreciate that other means of identifying the P-CSCF's may be used and the invention is not limited to any one type of network address.

Figure 2:
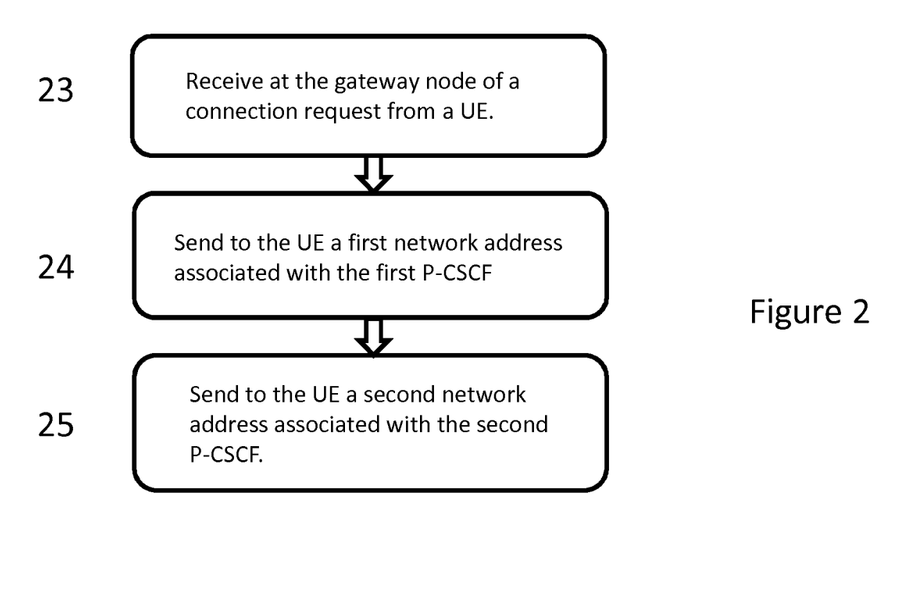
FIG. 2 is a flow diagram for a method of providing network addresses for dual registration in a visited network.

The process of dual registration using the method of the present invention commences according to an embodiment with the establishment of a connection with a gateway node, typically a PGW. A connection request may typically be in the form of an LTE attach request. In an embodiment, a Protocol Configurations Options (PCO) Information Element (IE) in the LTE Attach Request is used to carry the request details. FIG. 2 is a flow chart which illustrates the steps of the process of enabling dual registration by the provision of IP addresses to enable identification and connection to the respective P-CSCF nodes. The first step is the receipt (23) by the gateway node of a request for connection from the UE. In an embodiment, the connection request comprises an explicit request for two IP addresses. Alternatively, an explicit request for an IP address to enable registration with an RCS IMS may be sent. In this embodiment, the gateway node responds to a request for an IP address for enabling registration with an RCS IMS by assuming that the desire for RCS registration implies a requirement for dual registration. In another embodiment, the gateway node may be configured to provide two IP addresses in response to any connection request from the UE.

If the gateway node is enabled to support a method according to the invention, then it will respond to the request by providing and sending to the UE a first network address (24) associated with the P-CSCF which enables registration with the first IMS and a second network address (25) associate with the P-CSCF which enables registration with the second IMS. Typically the first IMS is a Voice over Long Term Evolution (VoLTE) IMS and the second IMS is a Rich Communication Services (RCS) IMS. However, the person skilled in the art will appreciate that the method may be used to enable registration with any types and combinations of the IMS networks. It is also envisaged that there may be more than two IMS networks to which registration is desired, in which case the appropriate number of IP addresses, associated with each of the P-CSCF nodes which provide access to respective IMS networks, is provided. The invention is not limited to a particular number of IMS networks or any particular types or combination of types of IMS network.

The IP addresses are then transmitted to the UE. In an embodiment, the addresses are sent in the Protocol Configuration Options (PCO) Information Element (IE) of an LTE "ACTIVATE DEFAULT EPS BEARER CONTEXT REQUEST". However, the person skilled in the art will appreciate that there are many options for communicating the IP addresses to the UE and the invention is not limited to any one method of communicating network addresses. In an embodiment, an indication is sent with one or both of the addresses to indicate to the UE with which type of service an IP address is associated. This may be in the form of an explicit indication or an implied indication for example by the order in which the addresses are sent. The person skilled in the art will appreciate that there are many different options for providing this indication and the invention is not limited to any one method.

Upon receipt of the two IP addresses, the UE is enabled to register with the respective IMS networks. This involves a connection being set-up with the P-CSCF corresponding to each of the IMS networks using the IP addresses supplied. In an embodiment, this involves the set-up of an IPsec connection. Once the connection with the P-CSCF has been established, registration with the corresponding IMS network in the UE's home network may be performed.

Figure 3:
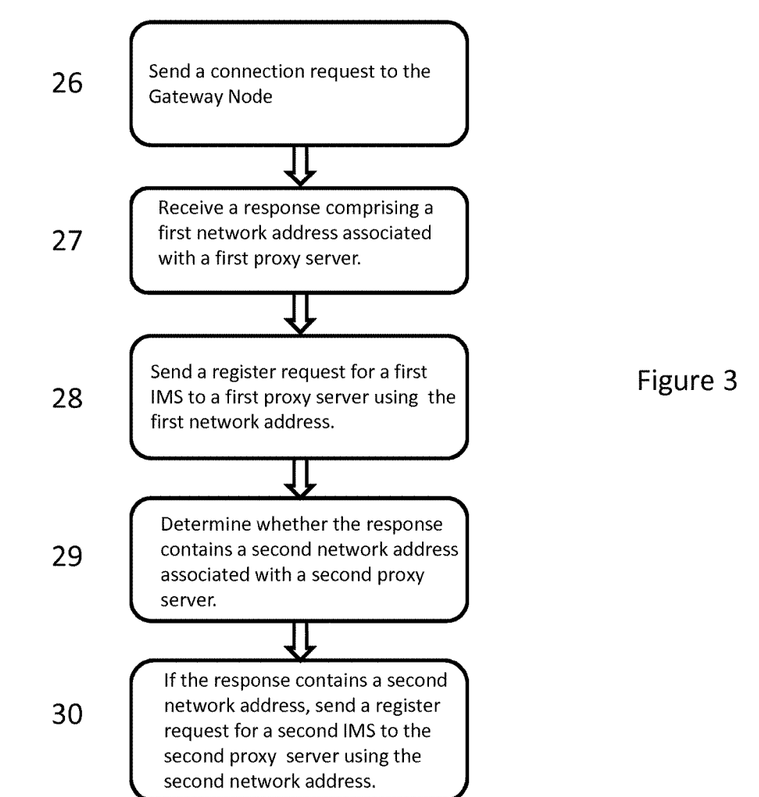
FIG. 3 is a flow diagram for the method of FIG. 2 showing the steps performed at a User Equipment.

On making the connection request, the UE may not know whether the gateway node to which it is connecting supports the method according to the invention. According to an embodiment, on receipt of the response from the PGW, the UE checks whether a second IP address has been supplied. FIG. 3 is a flow chart illustrating the process whereby the UE requests a connection and reacts to the response received. The process begins with the UE sending (26) a connection request to the gateway node. A response is received (27), which contains at least one network address. The UE uses this first IP address to send a register request (28) with the first IMS network. The UE then determines (29) whether the response received from the gateway node contains a second network address. If a second network address is present, then this network address is used to send (30) a register request using this IP address to the P-CSCF associated with the second IMS to which registration is desired.

Figure 4:
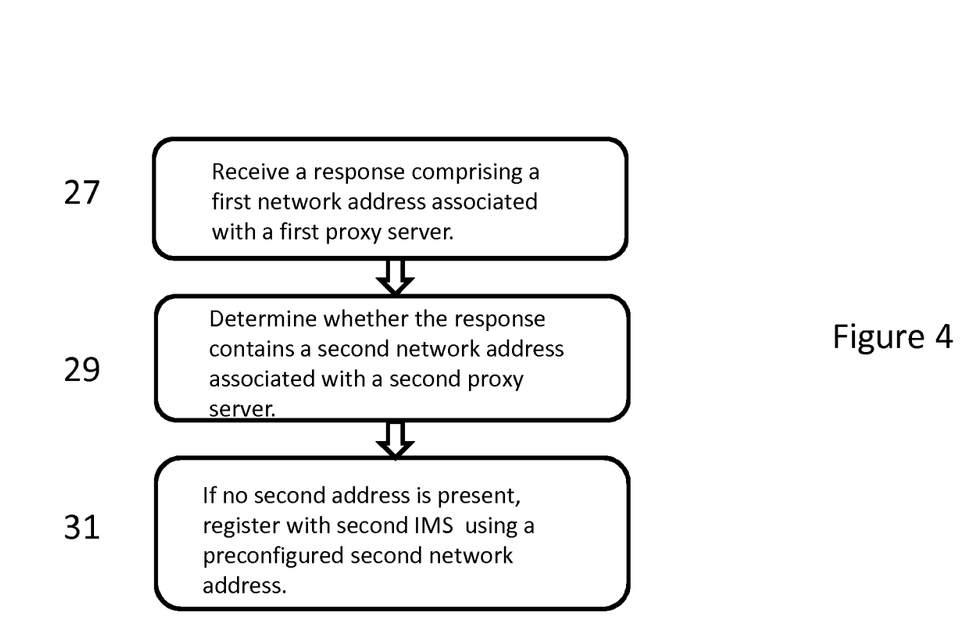
FIG. 4 is a flow diagram for a method of providing a secondary mechanism for dual registration.

If there is no second address in the response from the gateway node, an alternative approach is required. FIG. 4 is a flow chart of this alternative approach. As before, a response containing a first network address is received by the UE (27). This first address may then be used as in the process of FIG. 3, to send a register request to the P-CSCF associated with the first IMS. A determination is made (29) as to whether the response contains a second network address. If it is determined that no second address is present (31), then a preconfigured second network address is used. In order to implement registration with the second IMS using this preconfigured network address, a second PDN connection must be established. A connection can then be made with a P-CSCF in the home network of the UE using the preconfigured network address. This P-CSCF enables registration with the second IMS. According to an embodiment the preconfigured network address is provided by means of an OMA device Management Protocol Management Object (MO).

Figure 5:
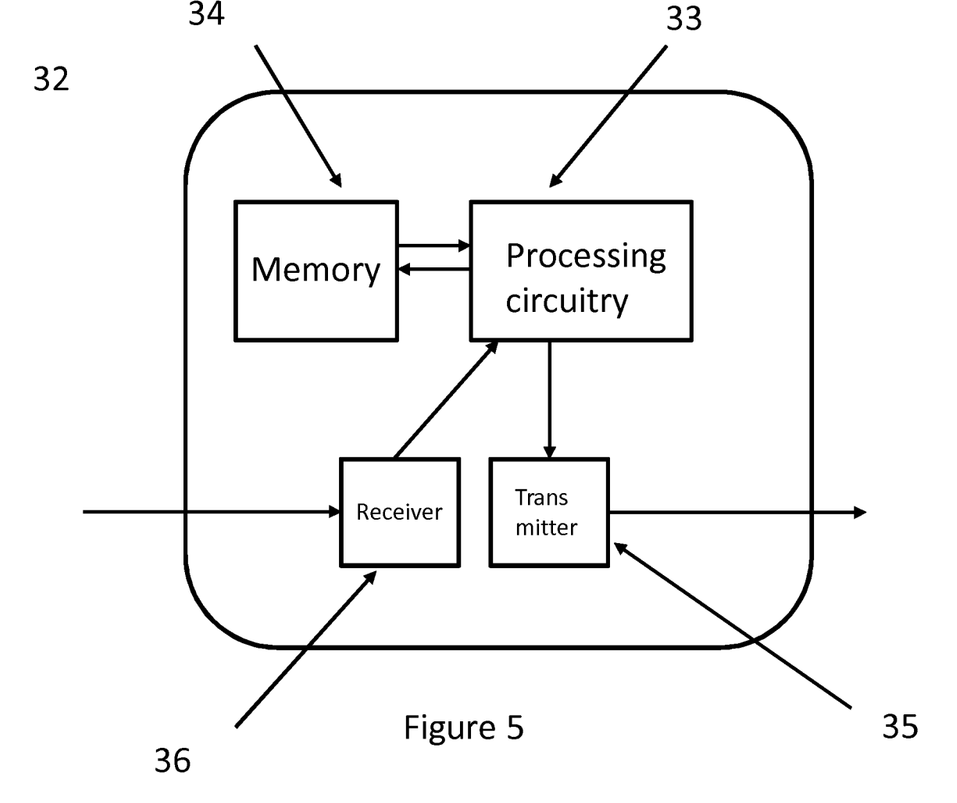
FIG. 5 is a schematic diagram of apparatus for use in user equipment according to an embodiment.

FIG. 5 is a schematic diagram illustrating a typical arrangement for apparatus (32) in user equipment for implementing a method according to the invention. It comprises processor circuitry (33), a storage unit (34) for storing instructions executable by the processor circuitry, transmitter (35) and receiver (36).

Figure 6:
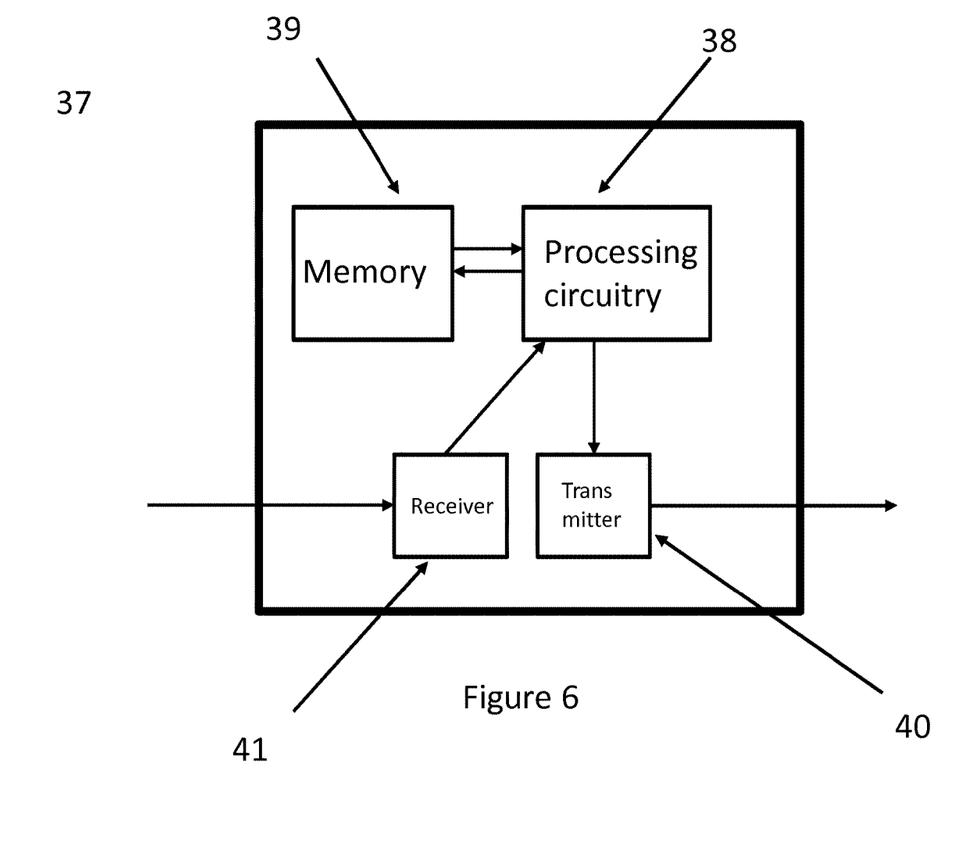
FIG. 6 is a schematic diagram of apparatus for use in a gateway node according to an embodiment.

The corresponding gateway node apparatus (37) is illustrated schematically in FIG. 6. This apparatus comprises processor circuitry (38), a storage unit (39) for storing instructions executable by the processor circuitry, a transmitter (40) and a receiver (41).

Figure 7:
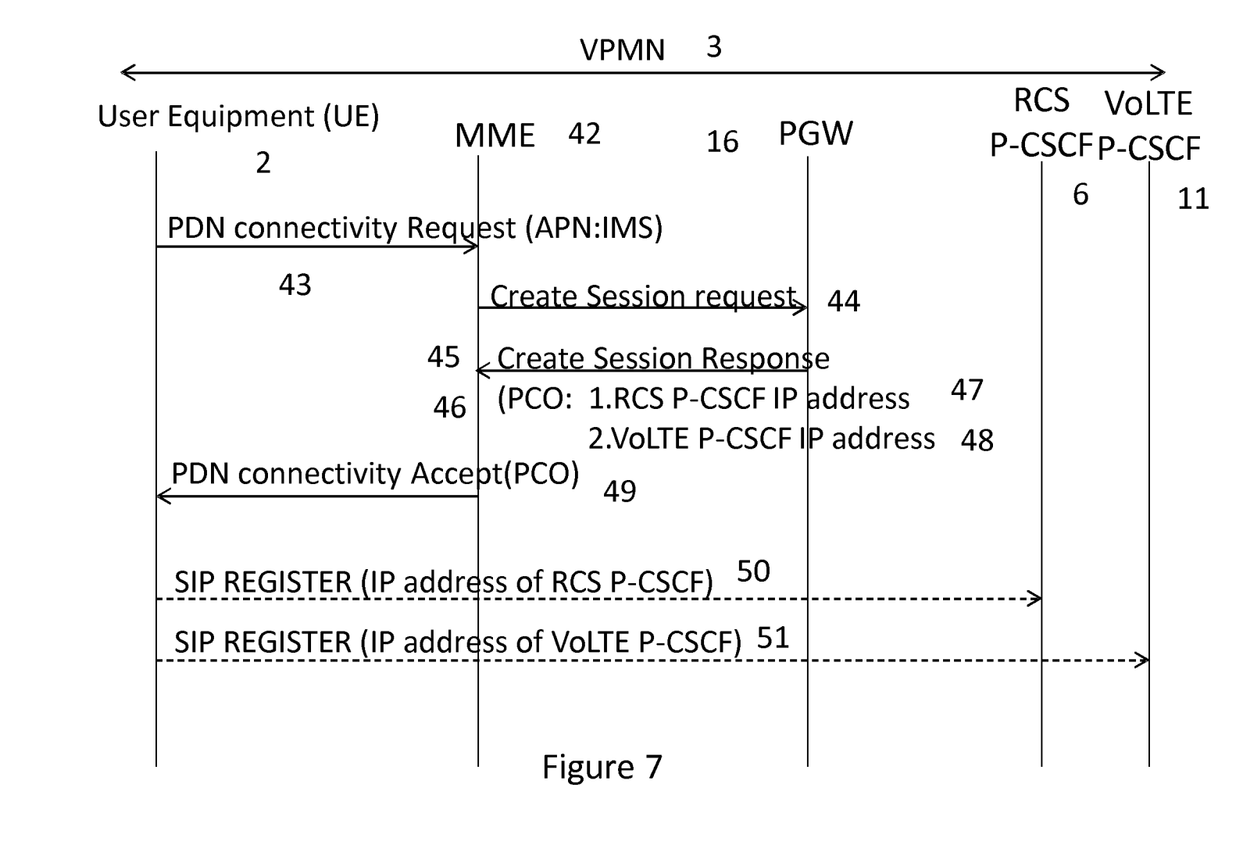
FIG. 7 is a signaling diagram for the method of dual registration according to an embodiment.

FIG. 7 is a signaling diagram according to an embodiment. In this embodiment, the UE (2) is roaming and the signaling is within a VPMN (3). Additional signaling, not shown takes place within the home network and between the networks. This additional signaling however is entirely conventional, with the exception that the conventional messages used in a conventional single registration which are sent from the P-CSCF in the visited network to the I-CSCF in the home network are performed for both P-CSCF's for the first and second IMS registrations respectively. If the invention is implemented by a UE within its home network then the same signaling occurs between the network elements shown in FIG. 7, with additional conventional signaling performed for each registration between the P-CSCF nodes and their respective IMS networks.

The signaling takes place between the UE (2), the Mobility Management Entity (MME) (42), the gateway node (PGW) (16) and the respective P-CSCF nodes for the VoLTE IMS (11) and the RCS IMS (6). The process beings with a PDN connectivity request (43) sent from the UE (2) to the MME (42). A Create Session request (44) is transmitted from the MME (42) to the PGW (16), which responds with a Create Session response (45). In an embodiment, the Create Session Response uses a Protocol Configuration Options (PCO) Information Element (IE) (46) to contain an IP address for the RCS P-CSCF (47) and an IP address (48) for the VoLTE P-CSCF. These are sent to the MME (42), which forwards them to the UE (2) in a PDN Connectivity Accept (49). The final steps in the signaling according to an embodiment comprise sending two SIP Register requests using the respective IP addresses of the P-CSCF for the RCS IMS (50) and the VoLTE IMS (51). The person skilled in the art will appreciate that the signaling illustrated in FIG. 7 is exemplary only and that alternative signaling arrangements are possible and fall within the scope of the invention. For example, the request for network addresses in order to perform dual registration may be separate from the connection request. In another embodiment the request may be sent directly to the network node which provides the network addresses. The invention is not limited to any one signaling arrangement or sequence.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of enabling dual registration of a User Equipment, UE, with first and second Internet Protocol Multimedia Subsystem, IMS, networks, the method comprising, in response to a connection request made to a gateway node by the UE, sending to the UE, network addresses of respective first and second Proxy Call Session Control Functions, P-CSCF, the first and second P-CSCFs being configured to enable IMS registrations to the first and second IMS networks respectively.

2. The method of performing dual registration of a UE comprising the step of enabling registration according to claim 1, further comprising:
registration by the UE with the first IMS via the first P-CSCF using the first network address; and
registration by the UE with the second IMS via the second P-CSCF using the second network address.

3. The method as claimed in claim 1, wherein the User equipment is located in a Visited Public Mobile Network, VPLM, and the first and the second IMS networks are associated with a home network of the UE.

4. The method as claimed in claim 1, wherein at least one of the first and the second IMS networks is one of: a Voice over Long Term Evolution, VoLTE, IMS and a Rich Communications Services, RCS, IMS.

5. The method as claimed in claim 1, wherein the wherein the connection request comprises a Long Term Evolution, LTE, Attach request.

6. The method as claimed in claim 5, wherein the connection request comprises a network address request located in a Protocol Configuration Options, PCO, Information Element, IE.

7. The method as claimed in claim 1, wherein the connection request comprises a Rich Communications Services, RCS, P-CSCF address request.

8. The method as claimed in claim 1, wherein at least one of the first network address and the second network address is provided by means of the PCO IE in an ACTIVATE DEFAULT EPS BEARER CONTEXT REQUEST message to the UE.

9. The method as claimed in claim 1, wherein at least one indication associated with at least one of the first and the second network address indicating the type of service to which the network address enables connection is provided to the UE.

10. An apparatus for use in user equipment in a communication network, the apparatus comprising: processor circuitry; a storage unit storing instructions executable by the processor circuitry, a transmitter and a receiver, whereby the apparatus is operative to:
send a connection request to a gateway node;
receive, in response to the connection request, a response comprising a first network address associated with a first P-CSCF;
send a register request for a first IMS to the first P-CSCF using the first network address; and
upon determining that the response contains a second network address associated with a second P-CSCF, send a register request for a second IMS to the second proxy server using the second network address.

11. The apparatus as claimed in claim 10, further configured to: upon determining that the response does not contain a second network address:
send a register request for a second IMS to a P-CSCF located in a home network of the UE using a pre-configured network address.

12. The apparatus as claimed in claim 10, configured to:
send a connection request to and receive a response from a gateway node located in a visited network: and
send register requests to a first and a second IMSs located in a home network of the UE.

13. The user equipment comprising apparatus as claimed in claim 10.

14. An apparatus for use in a network gateway in a Public Land Mobile Network, PLMN, the apparatus comprising: processor circuitry; a storage unit storing instructions executable by said processor circuitry; a transmitter and a receiver; whereby the apparatus is operative to:
receive from a User Equipment, UE, a connection request; and
in response to the request, send a first and a second network address associated respectively with a first and a second P-CSCF;
wherein the first and second network addresses enable the UE to register respectively with a first and a second IMS.

15. The apparatus as claimed in claim 14, configured to provide the first and second network addresses in response to the request received from UE for which the PLMN is a visited network.

* * * * *